Patented July 4, 1939

2,165,022

UNITED STATES PATENT OFFICE 2,165,022

WELDING ROD

William Clifford Anderson, Fort Peck, Mont.

No Drawing. Application April 7, 1937,
Serial No. 135,508

4 Claims. (Cl. 219—8)

(Granted under the act of March 3, 1883, as
amended April 30, 1928; 370 O. G. 757)

This invention described herein may be manufactured and used by or for the Government for governmental purposes, without the payment to me of any royalty thereon.

This invention generally relates to electric welding, but more especially it is directed to a welding process, the composition of the welding rod used in said process, and the mode of forming the rod.

One object of the invention is to provide a welding rod having a coating, which during the welding process forms a transparent envelope of non-poisonous gases surrounding the arc, adapted to exclude atmospheric oxygen, and thus provide a weld free from gas pockets and slag, without interfering with the vision or endangering the health of the operator.

Another object of the invention is to provide a welding rod formed of a mechanical mixture of ingredients heated to a comparatively low temperature, such as that prevailing in the ordinary blast furnace.

Another object of the invention is to provide a coating for welding rods which has the consistency of paint and which may be applied by merely dipping the cast rods into a solution thereof.

Another object of this invention is to provide a welding process wherein an envelope of non-poisonous gas is formed around the welding arc, the gas being transparent and functioning to exclude atmospheric oxygen and thus provide a weld free from gas pockets and slag.

A further object of the invention is to provide a process for forming a welding rod, having all the characteristics of the rods composed of alloys formed by heat treatment in the electric furnace at high temperatures, but being composed of a mechanical mixture subjected to the comparatively low temperatures of the blast furnace.

With these and other objects in view this invention consists in certain novel details of construction, combination and arrangement of parts to be more fully hereinafter described and set forth in the accompanying claims.

The welding rod "stellite", commonly used today, is produced in the electric furnace at temperatures high enough to unite its elements, carbon, tungsten, iron, etc., into an alloy, whereas the welding rod which forms the subject matter of this invention, and which is composed of a mixture of specially selected elements, is produced in the blast furnace at comparatively low temperatures.

This mechanical mixture which constitutes the core of the improved welding rod, by passing only through the electric arc, will alloy itself with the ferric base material and become a component part of the base metal being coated. The result presents a smoother surface and a surface not unlike that of the base metal. The core of the improved welding rod is provided with a coating which is simpler in composition and application than the coatings previously used and consequently cheaper to manufacture. The coating consists principally of aluminum powder pigment mixed in an asphaltic base vehicle to the consistency of paint. The cast rods are coated by merely dipping them into this paint.

In the manufacture of these coated rods one formula which provides a suitable proportionate combination of ingredients to obtain the desired results is given below.

The rod consisted of gray cast iron, melted with other ingredients as follows:

| | Percent by weight |
|---|---|
| Carbon | 3.00 to 3.50 |
| Nickel | 2.00 to 3.00 |
| Molybdenum | 2.25 to 3.00 |
| Manganese | 1.00 to 1.50 |
| Chromium | 3.50 to 4.50 |
| Sulphur | max .10 |
| Phosphorus | do .30 |

A coating which may be used with a rod of this type consists of—

| | Percent by weight |
|---|---|
| Mineral spirits | 72.3 |
| Aluminum | 20.9 |
| Water glass | 6.8 |

Another formula for the composition of the rod is shown to have the ingredients listed below in approximately the proportions shown

| | Percent by weight |
|---|---|
| Iron | 91.40 |
| Carbon | 3.50 |
| Molybdenum | 2.00 |
| Manganese | .70 |
| Phosphorus | .30 |
| Sulphur | .10 |
| Nickel | 2.00 |

Another formula of ingredients for a coating for either of these rods or other rods of this type is composed of—

| | Percent by weight |
|---|---|
| Aluminum (powder) | 30 |
| Asphaltum | 15 |
| Mineral spirits | 42 |
| Water Glass | 12 |
| Carbon | 1 |

In the operation of welding, the mechanical mixture constituting the core of the welding rod, by passing through the arc, alloys itself with the ferric base material and becomes a component part of the base metal being coated, and during this process the coating emits a non-poisonous transparent gas which forms a protecting envelope for the weld, preventing oxidation by excluding atmospheric oxygen, and at the same time permitting clear vision of the work without endangering the health of operator by noxious or poisonous fumes.

Having described my invention, what I claim as new and wish to secure by Letters Patent is:

1. A sintered welding rod composed principally of ferrous material with not over 3.50 percent by weight of carbon, 3 percent by weight of nickel, 3 percent by weight of molybdenum, 1.50 percent by weight of manganese, 4.50 percent by weight of chromium, .10 percent by weight of sulphur, .30 percent by weight of phosphorus and coated with a mixture consisting of mineral spirits 72.3 percent by weight, 20.9 percent by weight of aluminum, 6.8 percent by weight of water glass.

2. A sintered welding rod composed principally of ferrous material with not over 3.50 percent by weight of carbon, 2.00 percent by weight of molybdenum, .70 percent by weight of manganese, .30 percent by weight of phosphorus, .10 percent by weight of sulphur, 2.00 percent by weight of nickel and coated by immersion in a bath having the consistency of paint and composed of aluminum powder 30 percent by weight, asphaltum 15 percent by weight, mineral spirits 42 percent by weight, water glass 12 percent by weight, carbon 1 percent by weight.

3. An electrode for arc welding and the like comprising a metallic core, coated by immersion in a bath having the consistency of paint and composed of mineral spirits 72.3 percent by weight, aluminum 20.9 percent by weight, water glass 6.8 percent by weight.

4. An electrode for arc welding and the like comprising a metallic core coated by immersion in a bath having the consistency of paint and consisting of aluminum powder 30 perecent by weight, mineral spirits 42 percent by weight, water glass 12 percent by weight, carbon 1 percent by weight, asphaltum 15% by weight.

WILLIAM CLIFFORD ANDERSON.